United States Patent [19]

Dunn et al.

[11] 4,385,918
[45] May 31, 1983

[54] METHOD AND APPARATUS FOR FEEDING RAW MATERIAL TO AN ARC FURNACE

[75] Inventors: Charles S. Dunn, Pataskala; Stephen Seng, Bladensburg, both of Ohio

[73] Assignee: Owens-Corning Fiberglas Corporation, Toledo, Ohio

[21] Appl. No.: 342,853

[22] Filed: Jan. 26, 1982

[51] Int. Cl.³ .............................................. C03B 3/00
[52] U.S. Cl. ...................................... 65/27; 65/335; 65/DIG. 4; 193/29; 414/160; 414/165
[58] Field of Search ............... 414/165, 172, 160, 208; 65/27, 335, DIG. 4; 193/29

[56] References Cited

U.S. PATENT DOCUMENTS

| | | | |
|---|---|---|---|
| 3,190,470 | 6/1965 | Ritter | 414/160 |
| 3,255,857 | 6/1966 | Armstrong et al. | 193/29 X |
| 3,260,587 | 7/1966 | Dolf et al. | 65/335 X |
| 3,276,859 | 10/1966 | Collin et al. | 65/DIG. 4 |
| 3,286,334 | 11/1966 | Hay | 65/DIG. 4 |
| 3,429,684 | 2/1969 | Plumat | 65/335 |
| 3,979,197 | 9/1976 | Froberg | 65/DIG.4 |
| 4,001,488 | 1/1977 | Bruff et al. | 414/208 X |
| 4,194,077 | 3/1980 | Canfield et al. | 65/335 X |

Primary Examiner—Robert L. Lindsay, Jr.
Attorney, Agent, or Firm—Ronald C. Hudgens; Patrick P. Pacella

[57] ABSTRACT

A method and apparatus for feeding pulverant raw material to an arc furnace having a plurality of arcing locations defined by vertical electrodes. A vertical feed tube gravitationally conveys the raw material to a central location inside the furnace which is above the arcing locations. A rotatable deflector is located at the bottom of the feed tube and is rotated in step-wise fashion to direct raw material from the feed tube to each of the arcing locations. A fixed deflector is located at each arcing location to confine the raw material fed into the furnace predominantly to the arcing locations. By locating most of the raw material at the arcing locations, the feeding mechanism of the present invention improves the stability of the arc and the melting efficiency of the furnace.

12 Claims, 5 Drawing Figures

METHOD AND APPARATUS FOR FEEDING RAW MATERIAL TO AN ARC FURNACE

TECHNICAL FIELD

This invention relates to the feeding of pulverant raw material to an arc-type melting furnace, preferably of the type having vertical electrodes. The raw materials are fed to the furnace predominantly at precise arcing locations to improve arc stability and melting efficiency.

BACKGROUND OF THE INVENTION

Arc-type melting furnaces have been proposed in the past for the melting of glass batch, slag, minerals, and other pulverant raw materials.

Typically, the arc is generated beneath a raw material layer or "blanket" which encompasses the lower ends of vertical electrodes and which forms an insulating top layer over the molten material in the furnace. Melting primarily takes place at the location of the spaced electrodes beneath the raw material blanket, and those raw materials which are located at the arcing locations melt more quickly and preferentially with respect to other portions of the batch blanket.

Additionally, arc stability requires that a body of unmelted batch be constantly present at each of the arcing locations. Thus, the prior art formation of a raw material or batch blanket of substantially equal depth across the top of the molten materials has resulted in the melting of that limited amount of material at each arcing location, and the raw material from other portions of the blanket is either inefficiently melted or must flow to the arcing location before it can be melted. Under these circumstances, it is difficult to maintain a stable arc and the efficiency of melting was at least partially dependent upon the flow of other portions of the batch blanket to the arcing location. There exists a need in the field of arc melters for a reliable mechanism and method for non-uniformly distributing raw material internally of an arc melting furnace and, particularly, for feeding and distributing raw material to the specific, most efficient arcing locations within the furnace.

DISCLOSURE OF INVENTION

The present invention provides for the feeding of raw material to an arc melting furnace so that the raw material is delivered to specific arcing locations within the furnace, and a more efficient, non-uniform raw material distribution is obtained to promote both the stability of the arc and melting efficiency.

More specifically and in its preferred form, the present invention proposes the gravitational feeding of raw material to a furnace through a vertical feed chute which terminates inside the furnace at a location medially of the arcing locations and above the arcing locations. Material from the chute is distributed internally of the furnace by means of a rotatable deflector which receives the material from the chute and which directs it laterally in a free-fall trajectory to the arching locations. The deflector rotates about the vertical axis and is aligned radially, in sequence, with each of the arcing locations. The deflector remains in registry with each arcing location until a sufficient amount of raw material has been delivered to the arcing location to build up the blanket depth at that location to an amount sufficient to promote arc stability and melting efficiency. The deflector then rotates into registry with a next successive electrode at which the deflector pauses to again deliver sufficient raw material for arc stability and melting efficiency. This operation continues throughout the operation of the furnace, and the incremental amount of batch delivered to each arcing location is sufficient to compensate for the amount of batch which shall be melted at that location during the period at which the deflector is aligned with other electrodes.

A preferred embodiment of the invention incorporates a fixed deflector at each arcing location to intercept the raw material deflected toward the arcing location by the rotary deflector, the fixed deflectors being of a size and shape to retain a sufficient supply of batch at the specific arcing location. By utilization of the combination of the single rotating deflector and of the multiple fixed deflectors, preferential location of raw material within the furnace is obtained, and the batch is heaped at each arcing location in surrounding relationship to the electrode at the arcing location to ensure the presence of sufficient batch for arc stability and melting efficiency.

The method of the present invention includes the feeding of a stream of raw material into the furnace at a location intermediate the electrodes, and the deflection of the raw material stream laterally to the arc location of each of the electrodes, in turn. Preferably, the deflected streams of raw material are confined at each of the electrode locations to ensure the presence of an adequate body of raw material at each arcing location.

BRIEF DESCRIPTION OF THE DRAWINGS

FIG. 4 is an enlarged sectional view taken along the plane 4—4 of FIG. 1; and

FIG. 5 is a schematic representation of a portion of the deflector drive mechanism.

DESCRIPTION OF THE PREFERRED EMBOIDMENT

Figure 1:
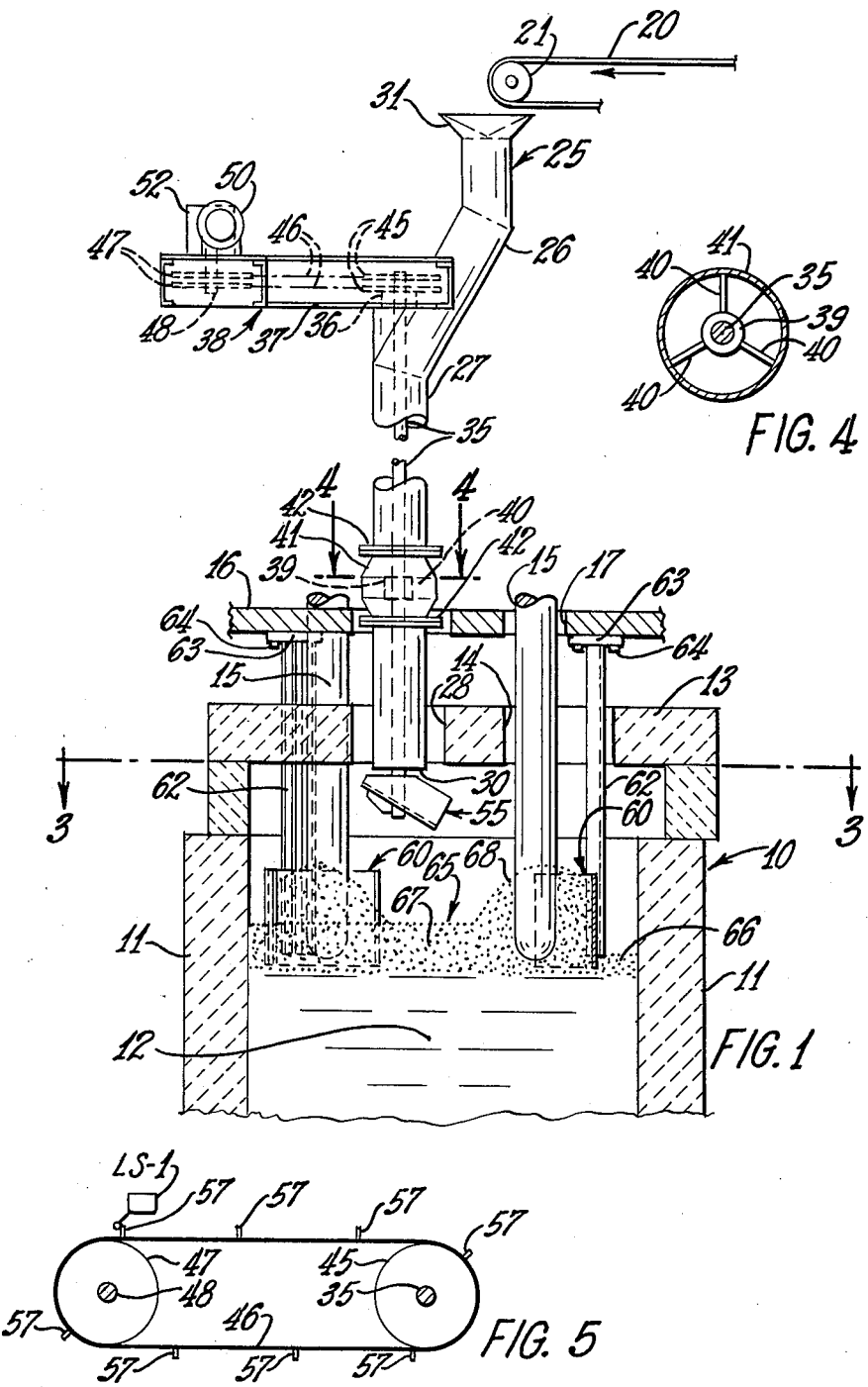
FIG. 1 is a side elevation, somewhat schematic in character, and with parts broken away and in section, of a furnace equipped with the raw material feeding apparatus of the present invention and capable of carrying out the method of the present invention.

In FIG. 1, reference numeral 10 refers generally to an arc melting furnace of conventional type having refractory sidewalls 11 confining a molten pool 12 of material being melted, for example, glass batch, basalt, or the like. The sidewalls 11 are surmounted by a refractory top 13 apertured, as at 14, to receive vertical electrodes 15 depending into the furnace and terminating slightly above the pool 12 of molten material. Each electrode 15 defines an arcing location at its lower end. Where three electrodes 15 are utilized, as in the embodiment shown and described herein, three arcing locations are defined. The electrodes are supported by means (not shown), such as the electrode supports which are specifically disclosed in application Ser. No. 342,870, filed in the U.S. Patent and Trademark Office on even date herewith and assigned to the assignee of the present invention. The electrodes themselves and the electrode supports form no part of this invention other than their correlation to and utilization in connection with the raw material feeding system herein disclosed.

Overlying the top 13 of the furnace is a supporting floor 16 which is apertured, as at 17, for passage of the electrodes 15 therethrough.

Raw materials, such as glass batch, pulverant basalt, and the like, is supplied to the furnace 10 by means of a supply conveyor 20 located above the furnace and trained about a dumping roll 21 from which the materials on the conveyor belt 20 are discharged. The amount of materials placed on the belt are carefully metered, and the amount of materials and the speed of the belt is correlated with the melting capacity of the furnace, as is well known in the art. If the melting capacity of the furnace is 500 pounds per hour, then the belt 20 is advanced at a speed calculated to dump 500 pounds of raw material per hour as the belt traverses the dumping roll 21.

Located beneath the dumping roll 21 is a feed chute 25 supported by an appropriate support means (not shown) and comprising a first, angularly related section 26 and a lower vertical section 27 which depends vertically through an aperture 28 in the furnace cover 13 to terminate at a lower end 30 located internally of the furnace 10 medially of the electrodes 15 and above the lower ends of the electrodes 15. Where the furnace 10 is provided with three electrodes, as in the present case (see FIG. 2), the lower end 30 of the feed chute 25 is located at the geometric center of the spaced electrodes 15 and well above the level of the molten pool 12 in the furnace 10.

The upper angularly directed portion 26 of the feed tube 25 is provided with an outwardly and upwardly flared upper end 31 for receiving material from the belt 20, and the raw material from the belt 20 travels through the feed tube 25 gravitationally into the furnace 10 at a location determined by the location of the lower open end 30 of the feed tube.

A rotatable shaft 35 extends axially of the lower vertical feed tube portion 27, the shaft being supported on an upper shaft bearing 36 carried by a supporting plate 37 forming a part of an upper support structure 38 and on a medial bearing 39 located in the feed chute lower section 27. The upper bearing is located above the juncture of the chute sections 26, 27. The lower bearing 39 is preferably of the sleeve type and axially receives the shaft 35 therethrough, as best shown in FIG. 4. The bearing 39 is supported on radial arms 40 which are carried at the inner periphery of an enlarged bearing housing 41 interposed in the vertical chute portion 27 and secured therein by radial flanges 42. Thus, the bearing 39 prevents any wobbling or shipping of the shaft 35 within the tubular chute section 27, yet does not materially impede the flow of material therethrough.

The vertical shaft 35 thus is supported by the support structure 38 and the bearing 36 to depend vertically and axially through the vertical chute portion 27. The shaft 35 is driven for rotation by a pair of sprockets 45 fixed to the upper end of the shaft 35 and rotationally driven by chains 46 wrapping driving sprockets 47. The driving sprockets 47 are driven by a vertical shaft 48 to which the sprockets are fixed, and the shaft 48 is driven, in turn, by an electric motor 50 (FIG. 2) connected by coupling 51 to a right-angle change-speed drive unit 52 having the shaft 48 as its output.

Fixed to the lower end of the rotatable shaft 35 is a rotatable deflector indicated generally at 55. The rotatable deflector 55 preferably is formed of sheet metal and is of "U"-shape in cross-section to provide an upwardly facing, interior, concavo-complex deflecting surface 56 (FIG. 3) which is directly axially aligned with the open lower end 30 of the feed chute 25 and upon which raw material falling through the vertical chute section 27 directly impinges. The rotatable deflector 55 is carried by the shaft 35 for co-rotation therewith as the shaft 35 is driven by its drive train, including the sprockets 45, 47, the chain 46, the angle drive 52 and the motor 50.

As best seen in FIG. 5, the chain 46 is provided with a plurality of outwardly projecting actuating pins 57 which successively engage and actuate a limit switch LS-1 located on the support structure 38 immediately adjacent the sprocket 47. When the limit switch LS-1 is engaged by one of the pins 57, the motor 50 is stopped and a timer (not shown) is actuated. When the timer times out, the motor 50 is actuated to rotate the sprocket 47 and, through the above-described drive train, to rotate the shaft 35 until the limit switch LS-1 is engaged by the next successive pin 57. Thus, the combination of the pins 57 and the limit switch LS-1 effects the intermittent rotation of the shaft 35 and the positioning of the rotary deflector 55 at fixed points within its rotational path. By correlating the positions of the pins 57 with the positioning of the rotary deflector 55, the rotary deflector is positioned in alignment with one of the electrodes 15 (as in FIG. 3) each time the limit switch LS-1 is engaged by one of the pins 57. The rotary deflector 55 then remains in its position aligned with a specific electrode 15 until the timer times out, at which time the motor 50 is energized to rotate the shaft 35 until the next successive pin 57 engages the limit switch LS-1. At this time, the rotary deflector 55 is aligned with the next adjacent electrode 15, and the rotary deflector 55 remains in alignment with this next successive electrode 15 until the timer times out. In this fashion, the rotary deflector 55 is intermittently rotated into successive alignment with the various electrodes 15.

Figure 3:
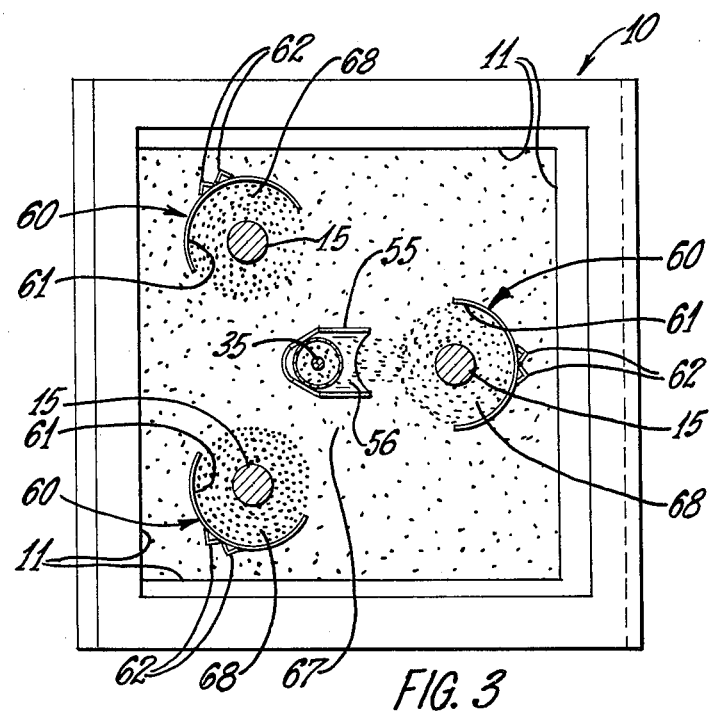
FIG. 3 is an enlarged sectional view taken along the plane 3—3 of FIG. 1.

When the rotary deflector 55 is aligned with a specific electrode 15, the concavo-convex surface 56 deflects the raw material passing through the feed tube 27 toward the specific electrode aligned with the rotary deflector 55, as best shown in FIG. 3.

Figure 2:
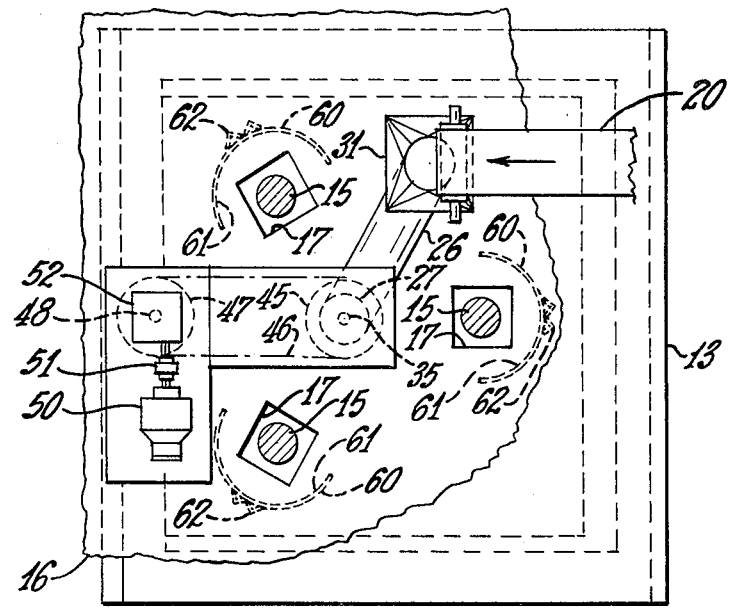
FIG. 2 is a plan view of the apparatus of FIG. 1.

To further aid in retaining the raw material in the vicinity of each electrode 15, stationary deflectors 60 (best seen in FIG. 3) are provided. These stationary deflectors are of arcuate shape to provide semi-cylindrical inner surfaces 61 which are concentric with the adjacent electrode 15. More specifically, as shown in FIGS. 1 and 2, the deflectors 60 preferably are each formed of sheet metal bent to a semi-cylindrical contour and welded or otherwise secured on their back surfaces to vertical supporting stanchions 62 which may be appropriately formed of angle iron vertically oriented to project upwardly through the apertures 14 in the furnace cover 13. Each stanchion 62 is provided at its upper end with a lateral bracket 63 welded or otherwise secured to the stanchion and projecting laterally to underlie the floor 16. Each bracket 63 is secured to the floor by suitable means, as by a screw or bolt 64. If desired, primarily for ease of fabrication, each semi-cylindrical deflector 60 may be subdivided into two arcuate portions, each having its own stanchion 62 and bracket 63, the arcuate portions being interconnected by suitable connector or latching means.

In operation, it could be readily understood that raw material on the conveyor 20 is conveyed around the dumping roll 22 and dropped into the feed chute 25 for gravitational free-fall downwardly therethrough. The pulverant raw material issuing from the lower end 30 of the vertical feed tube section 27 contacts the upper surface of the deflector 55 and is deflected thereby both laterally and vertically within the furnace, the raw material falling in a free-fall trajectory under the influence of gravity. By the drive mechanism above explained, the rotary deflector 55 is successively directed toward the individual electrodes 15, and the material falling from the deflector 55 contacts the fixed deflector 60 at the specific electrode so that the raw material is heaped at the electrode location, as best illustrated in FIG. 1.

Of course, the feeding of raw material from the lower end of the feed chute 30 and on to the deflector 55 continues as the deflector is rotated from its position aligned with one electrode to its position aligned with the next successive electrode. This material is not directed toward a specific electrode but is generally distributed over the surface of the molten material 12 in the furnace 10. Thus, a batch blanket of the configuration illustrated in FIG. 1 is obtained, wherein the batch blanket 65 is distributed so that a minimal amount is located at the outer edges of the molten pool 12 adjacent the sidewalls 11 of the furnace, as indicated at 66; a somewhat greater amount of batch is located intermediate the electrodes, as indicated at 67; and the batch is heaped around each electrode 15, as indicated at 68.

In an arc furnace of the type illustrated in the drawings and contemplated for use with the present invention, the arcing location is primarily at the electrode location and, as a result of the utilization of the present invention, raw material is non-uniformly distributed over the molten material surface and is concentrated at the precise arcing locations within the furnace.

We claim:

1. A method of feeding glass batch raw material to an electric glass furnace having multiple vertical electrodes, comprising the steps of feeding a stream glass batch raw material vertically into the furnace at a location intermediate to said electrodes, deflecting the stream laterally to the arc location of each of said electrodes in turn, and confining the deflected glass batch raw material predominantly to each of said electrode locations.

2. A method of feeding glass batch raw material to an electric arc glass furnace having a plurality of vertical electrodes, comprising the steps of gravitationally dropping a continuous stream of glass batch raw material into the furnace medially of the electrodes, impinging the stream onto a movable deflector located internally of the furnace, and indexing the deflector radially to direct the glass batch raw material toward each electrode in sequence.

3. In a method of feeding pulverant glass batch raw material predominantly to the arc location of each of a plurality of arcing electrodes located in a melting glass furnace, the steps of feeding a stream of glass batch raw material into the furnace at a location substantially equidistant from each arc location, interposing a deflector in the path of the glass batch raw material stream, and rotationally sequentially indexing said deflector into alignment with each electrode location to direct the glass batch raw material stream in substantially equal portions to each electrode location.

4. In a method of feeding pulverant glass batch raw material to the arc location of each of a plurality of arcing electrodes located in a melting glass furnace, the steps of sequentially directing a single central stream of glass batch raw material laterally to each of several electrode locations and intercepting the so-directed stream to retain the glass batch raw material in a melting zone substantially concentric with the electrode located at each arc location.

5. An apparatus for feeding pulverant glass batch raw material to an arc glass furnace having a plurality of arcing locations defined by vertical electrodes comprising a feed chute having its discharge end located in the furnace medially of said arcing locations, means for supplying glass batch raw material to the feed chute, a rotatable deflector aligned with the discharge end of said feed chute, and means for rotating said deflector to direct raw material from said chute toward said arcing locations.

6. An apparatus for feeding pulverant glass batch raw material to an arc glass furnace having a plurality of arcing locations defined by vertical electrodes, comprising a vertical feed tube having a lower discharge end located in the furnace generally above the arcing locations, means for supplying glass batch raw material to the feed tube, a rotatable deflector located at the discharge end of said feed tube, and means for rotating said deflector in step-wise fashion to a plurality of positions at each of which the deflector is aligned with one of said arcing locations.

7. An apparatus as defined in claim 6 and including a fixed arcuate deflector at each arcing location interposed in the path of glass batch raw material from the rotatable deflector.

8. An apparatus for feeding pulverant glass batch raw material to an arc glass furnace having a plurality of arcing locations defined by vertical electrodes, comprising a feed chute having its discharge end located in the furnace medially of the arcing locations, means for supplying glass batch raw material to the feed chute, and means located at the discharge end of the feed chute for directing raw material from said chute towards said arcing locations, respectively.

9. An apparatus as defined in claim 8 and including a deflector at each arcing location, each of the deflectors having a convex surface adjacent the arcing location and facing the feed chute to confine the glass batch raw material substantially at the arcing location.

10. An apparatus for feeding pulverant glass batch raw material to an arc glass furnace having a plurality of arcing locations defined by vertical electrodes, comprising feeding means for discharging glass batch raw material above the arcing locations, rotatable means interposed in the path of raw material from the feeding means to direct raw material from the feeding means toward said arcing locations, and fixed deflectors located at said arcing locations, respectively, said deflectors each being interposed in the path of glass batch raw material from the rotatable deflector for directing the glass batch raw material toward the adjacent arcing location.

11. A method as defined in claim 2, including the additional step of impinging the glass batch raw material from the movable deflector onto a fixed deflector located adjacent each of the electrodes.

12. In a method of distributing pulverant glass batch raw material internally of an arcing glass furnace having spaced arcing locations, the steps of feeding the glass batch raw material onto a rotary distributor located internally of the furnace equidistant from the arcing locations, and rotating said distributor in a predetermined pattern to predominantly feed the glass batch raw material to the spaced arcing locations.

* * * * *